United States Patent Office
3,799,931
Patented Mar. 26, 1974

3,799,931
PROCESS FOR THE MANUFACTURE OF DELTA 4-STEROIDAL LACTAMS
Robert J. Chorvat, Arlington Heights, and Raphael Pappo, Skokie, Ill., assignors to G. D. Searle & Co., Chicago, Ill.
No Drawing. Filed July 12, 1972, Ser. No. 271,151
Int. Cl. C07d 101/00
U.S. Cl. 260—289 AZ    4 Claims

ABSTRACT OF THE DISCLOSURE $\Delta^4$-steroidal lactams are manufactured by contacting the corresponding A-nor-1,2-seco-aldehydo acids with ammonium formate in formic acid, at elevated temperatures.

This is a continuation-in-part of our copending application Ser. No. 100,419, filed Dec. 21, 1970, now abandoned.

The present invention is concerned with a process for the manufacture of steroidal $\Delta^4$-lactams represented by the following partial structural formula

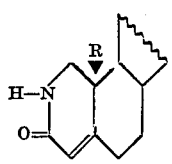

wherein R is methyl or the methyleneoxy portion of a 6,19-oxido bridge. This process comprises contacting steroidal $\Delta^4$-1,2-seco aldehydo acids, which are in equilibrium with the corresponding lactol form, with ammonium formate in formic acid solution at elevated temperature. The process is shown in Scheme I.

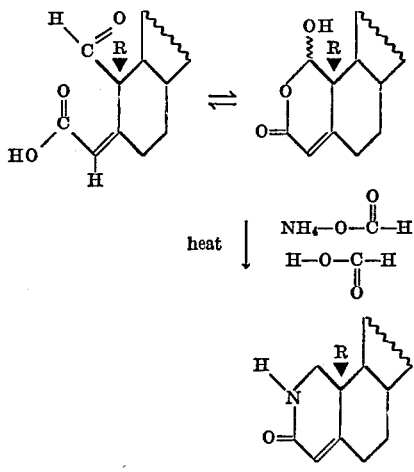

Scheme I

U.S. Pat. 3,644,342 describes the preparation of the lactol precursors. The chemical reaction is an example of reductive amination, followed by cyclization, in which the carbon to carbon double bond of the resulting $\alpha,\beta$ unsaturated lactam is not reduced. The failure to reduce the carbon to carbon double bond is a novel and unanticipated feature of this reaction since formic acid reducing conditions are known to reduce $\alpha,\beta$ unsaturated ketones. M. Sekiya and K. Suzuki, Chem. Pharm. Bull., 18, 1530 (1970). Other reductive amination conditions such as Raney nickel-ammonia reduce unsaturated portions of the molecule during the course of the reaction. Thus, the $\Delta^4$-1,2-seco aldehydo acid, 6$\beta$,19-oxido-17$\beta$-hydroxy - 1 - oxo - 1,2 - seco-A-norandrost-3-en-2-oic acid, is converted to the $\Delta^4$-lactam, 2-aza-6$\beta$,19-oxido-17$\beta$ - hydroxy-androst - 4 - en-3-one by refluxing the former compound in ammonium formate formic acid solution.

2 - aza - 6$\beta$,19 - oxido - 17$\beta$ - hydroxy-androst-4-en-3-one is a key intermediate in the preparation of 2-aza-estrone derivatives, which are potent antiviral agents as disclosed in our copending U.S. patent application Ser. No. 100,419, filed Dec. 21, 1970. 2-aza-17$\beta$-hydroxy-androst-4-en-3-one is the 2-aza analog of testosterone and has valuable pharmacological properties in that it exhibits anabolic and androgenic hormonal activity, as is disclosed in U.S. Pat. 3,290,287.

The invention will appear more fully from the examples which follow. These examples are given by way of illustration only and are not to be construed as limiting the invention either in spirit or in scope since many modifications both in materials and methods will be apparent to those skilled in the art. In these examples, temperatures are given in degrees centigrade (° C.) and quantities of materials in parts by weight except where otherwise noted.

EXAMPLE 1

To 350 parts of ammonium formate dissolved in 400 parts by volume of hot (100°) formic acid under nitrogen is added 36.5 parts of 6$\beta$,19-oxido-17$\beta$-hydroxy-1-oxo-1,2-seco-A-norandrost-3-en-2-oic acid. The reaction mixture is heated at reflux for 24 hours and then cooled by adding 1000 parts of water. The resulting precipitate is filtered and the aqueous formic acid solution is extracted with chloroform. The chloroform extracts are washed with water and dried over anhydrous sodium sulfate. The solvent is removed under reduced pressure, affording an oily residue. The combined precipitate and oily residue are dissolved in a solution consisting of 100 parts by volume of methanol and 50 parts by volume of 4 N aqueous sodium hydroxide solution. The resulting solution is refluxed for 30 minutes and then cooled. The addition of 100 parts by volume of water results in the formation of a precipitate. The isolated precipitate is 2-aza-6$\beta$,19-oxido-17$\beta$-hydroxyandrost-4-en-3-one, melting at 247–250°. This compound has the following formula

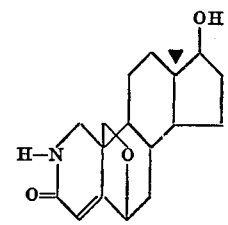

EXAMPLE 2

Following the procedure in Example 1, 2.4 parts of 17$\beta$ - hydroxy-1-oxo-1,2-seco-A-norandrost-3-en-2-oic acid in the presence of 25 parts of ammonium formate and 20 parts by volume of formic acid is converted to 2-aza-17$\beta$-hydroxy-androst-4-en-3-one, melting at 280–282°. This compound has the following formula

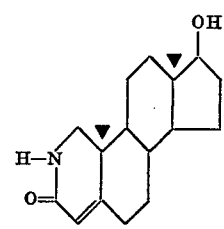

EXAMPLE 3

Following the procedure in Example 1, 3.2 parts of 1-oxo-1,2-seco-A-norcholest-3-en-2-oic acid in the presence of 37 parts of ammonium formate and 37 parts by volume of formic acid is converted to 2-aza-2-cholest-4-en-3-one, melting at 252.5–255.5°. This compound has the following formula

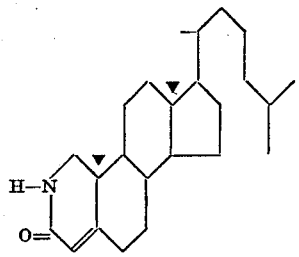

What is claimed is:

1. The process for the manufacture of Δ⁴-steroidal lactams which comprises the step of contacting a Δ⁴-1,2-seco aldehydo acid with ammonium formate in formic acid at elevated temperature.

2. The process of claim 1, wherein the Δ⁴-1,2-seco aldehyde is 17β-hydroxy-1-oxo-1,2-seco-A-norandrost-3-en-2-oic acid.

3. The process of claim 1, wherein the Δ⁴-1,2-seco aldehyde is 1-oxo-1,2-seco-A-norcholest-3-en-2-oic acid.

4. The process of claim 1, wherein the Δ⁴-1,2-seco aldehyde is 6β,19 - oxido-17β-hydroxy-1-oxo-1,2-seco-A-norandrost-3-en-2-oic acid.

References Cited

UNITED STATES PATENTS 3,280,133  10/1966  Pappo et al. ____ 260—289 AZ
3,290,287  12/1966  Mazur et al. ____ 260—289 AZ
2,897,202   7/1959  Wildi _____ 260—289 AZ

OTHER REFERENCES

Sekiya et al., Chem. Pharm. Bull., vol. 18, p. 1530 (1970).

DONALD G. DAUS, Primary Examiner

U.S. Cl. X.R.

260—283 SY, 343.2 S, 514 R